United States Patent [19]
Ando

[11] Patent Number: 5,787,060
[45] Date of Patent: Jul. 28, 1998

[54] OPTICAL DATA RECORDING/ REPRODUCING APPARATUS FOR PRODUCING DATA AND SERVO SIGNALS USING DIFFERENT LIGHT RECEIVING AREAS OF A LIGHT RECEIVER

[75] Inventor: Hirotake Ando, Tokyo, Japan

[73] Assignee: Canon Kabushiki Kaisha, Tokyo, Japan

[21] Appl. No.: 786,120

[22] Filed: Jan. 17, 1997

Related U.S. Application Data

[63] Continuation of Ser. No. 229,673, Apr. 19, 1994, abandoned.

[30] Foreign Application Priority Data

Apr. 27, 1993 [JP] Japan .................. 5-122078

[51] Int. Cl.[6] ........................................ G11B 7/00
[52] U.S. Cl. ...................... 369/44.42; 369/44.23; 369/44.41
[58] Field of Search ................... 369/44.23, 44.37, 369/44.41, 44.42, 44.14, 110, 13; 250/201.5; 360/114

[56] References Cited

U.S. PATENT DOCUMENTS

| | | | |
|---|---|---|---|
| 4,993,011 | 2/1991 | Torazawa et al. | 369/44.37 |
| 5,043,960 | 8/1991 | Nakao et al. | 369/13 |
| 5,105,409 | 4/1992 | Kaku et al. | 369/44.42 X |
| 5,107,101 | 4/1992 | Ando | 250/201.5 |
| 5,113,386 | 5/1992 | Whitehead et al. | 369/44.41 |
| 5,140,573 | 8/1992 | Ando | 369/44.28 |
| 5,629,911 | 5/1997 | Sasaki | 369/44.42 |

FOREIGN PATENT DOCUMENTS

| | | | |
|---|---|---|---|
| 0439876 | 8/1991 | European Pat. Off. | 369/44.23 |

*Primary Examiner*—Thang V. Tran
*Attorney, Agent, or Firm*—Fitzpatrick, Cella, Harper & Scinto

[57] ABSTRACT

An optical data recording/reproducing apparatus includes a light-receiving unit for receiving a light beam which has passed through or is reflected by a recording medium, the light-receiving unit having a plurality of light-receiving areas which are disposed such that they can perform wavefront splitting on the single light beam when the light-receiving areas receive the light beam, a data signal sensing unit for obtaining a data signal on the basis of an output of at least one of the plurality of light-receiving areas, and a servo signal sensing unit for obtaining a servo signal on the basis of an output of at least one of the plurality of light-receiving areas. The light-receiving area used to obtain the data signal and the light-receiving area used to obtain the servo signal are different from each other.

18 Claims, 7 Drawing Sheets

OPTICAL DATA RECORDING/ REPRODUCING APPARATUS FOR PRODUCING DATA AND SERVO SIGNALS USING DIFFERENT LIGHT RECEIVING AREAS OF A LIGHT RECEIVER

This application is a continuation of application Ser. No. 08/229,673, filed Apr. 19, 1994, now abandoned.

BACKGROUND OF THE INVENTION

The present invention relates to an optical data recording/ reproducing apparatus, such as an optical magnetic (magneto-optical) data recording/reproducing apparatus, and more particularly, to an optical data recording/ reproducing apparatus whose characteristic features are a detection mechanism for detecting servo signals (including a focal point error signal and a tracking position error signal) and data signals (including an optical magnetic (magneto-optical) signal and an embossed signal), and the processing of such signals.

Figure 1:
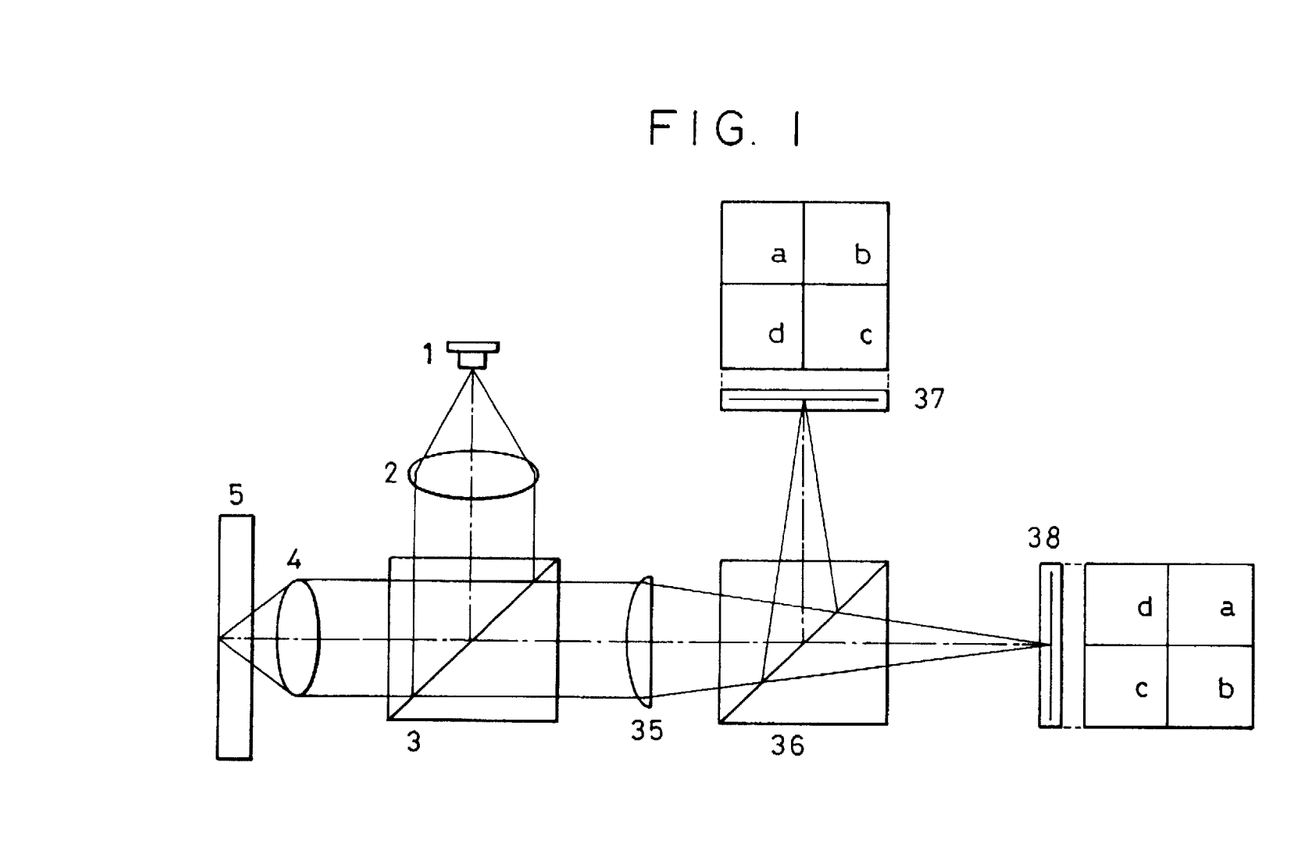
FIG. 1 illustrates an example of a detection mechanism for detecting servo signals and data signals in a conventional optical magnetic (magneto-optical) data recording/reproducing apparatus.

In conventional optical magnetic (magneto-optical) data recording/reproducing apparatus, the detection mechanism for servo signals and data signals is constructed in the manner shown in, for example, FIG. 1.

In FIG. 1, a collimator lens 2 converts a bundle of light rays emanating from a semiconductor laser 1 into a beam made up of parallel rays of light. After the beam made up of parallel rays is reflected by a beam splitter 3, it is converged onto the recording surface of an optical magnetic (magneto-optical) data recording medium 5 by an objective lens 4 to form a light spot. The light reflected by the recording surface of the data recording medium 5 passes through the objective lens 4 and the beam splitter 3, and is then converged by a cylindrical lens 35. Thereafter, the converged light beam is split into a reflected light beam and a transmitted light beam by a beam splitter 36. The two light beams are incident on sensors 37 and 38, which are photoelectric converting elements, respectively. Each of the sensors 37 and 38 has four light-receiving areas a, b, c and d.

In the apparatus shown in FIG. 1, signal detection is performed in the manner described below in which the outputs of respective light-receiving areas are designated by the same reference numerals as those of the light-receiving areas (hereinafter, the outputs of the light-receiving areas are indicated in the same manner). That is, detection of data signals is performed by obtaining an optical magnetic (magneto-optical) signal from a difference between the sum (a+b+c+d) of the outputs of all the light-receiving areas of the sensor 37 and the sum (a+b+c+d) of the outputs of all the light-receiving areas of the sensor 38 and by obtaining an embossed signal (a signal representing data preformatted on an optical magnetic (magneto-optical) data recording medium 5 using embossed pits) from a total of the sum (a+b+c+d) of the outputs of all the light-receiving areas of the sensor 37 and the sum (a+b+c+d) of the outputs of all the light-receiving areas of the sensor 38. Detection of servo signals is performed by obtaining a focal point error signal from, for example, (a+c)−(b+d) associated with the sensor 37 and by obtaining a tracking position error signal from, for example, (b+c)−(a+d) associated with the sensor 38.

Figure 2:
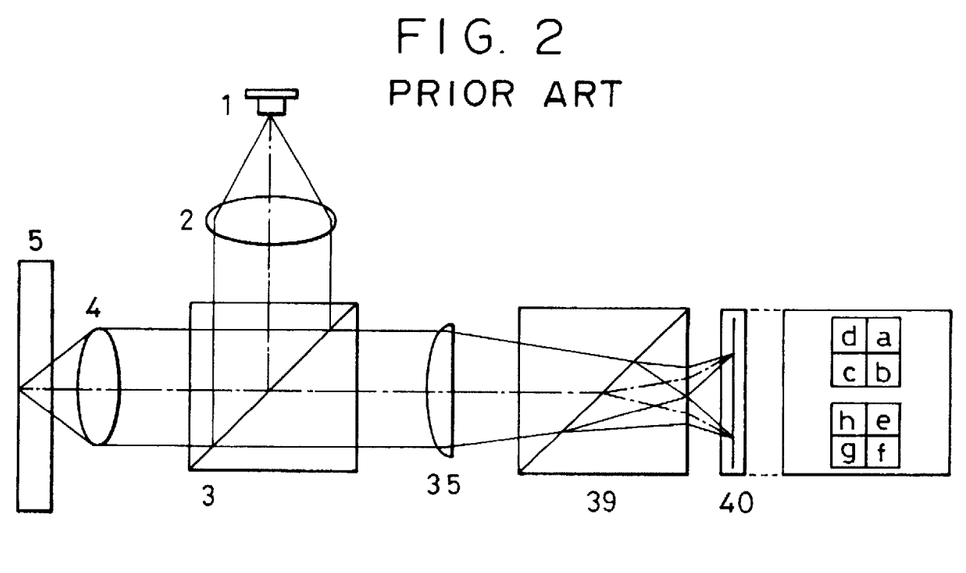
FIG. 2 illustrates another example of a detection mechanism for detecting servo signals and data signals in a conventional optical magnetic (magneto-optical) data recording/reproducing apparatus.

FIG. 2 shows another example of the detection mechanism for servo signals and data signals in the conventional optical magnetic (magneto-optical) data recording/ reproducing apparatus.

In the apparatus shown in FIG. 2, the structure made up of the semiconductor laser 1, the collimator lens 2, the beam splitter 3, the objective lens 4, the optical magnetic (magneto-optical) data recording medium 5 and the cylindrical lens 35 is the same as that shown in FIG. 1. The light beam from the cylindrical lens 35 is split into two light beams by a Wollaston prism 39. The split two light beams are made incident on a sensor 40 having two sensor portions on the same level surface. A first sensor portion of the sensor 40 has four light-receiving areas a, b, c and d, while a second sensor portion of the sensor 40 has four light-receiving areas e, f, g and h.

In the apparatus shown in FIG. 2, detection of data signals is performed by obtaining an optical magnetic (magneto-optical) signal from (a+b+c+d)−(e+f+g+h) and by obtaining an embossed signal from (a+b+c+d)+(e+f+g+h), while detection of servo signals is performed by obtaining a focal point error signal from, for example, (a+c)−(b+d) and by obtaining a tracking position error signal from, for example, (f+g)−(e+h).

Figure 3:
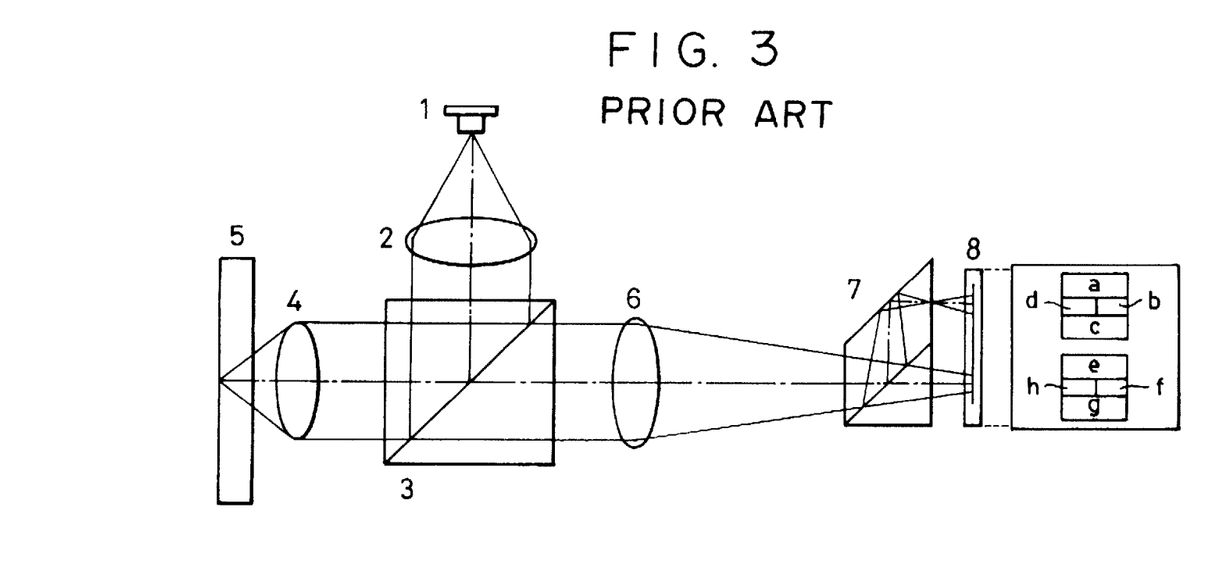
FIG. 3 illustrates another example of a detection mechanism for detecting servo signals and data signals in a conventional optical magnetic (magneto-optical) data recording/reproducing apparatus.

FIG. 3 shows still another example of the detection mechanism for servo signals and data signals in the conventional optical magnetic (magneto-optical) data recording/reproducing apparatus.

In the apparatus shown in FIG. 3, the structure made up of the semiconductor laser 1, the collimator lens 2, the beam splitter 3, the objective lens 4 and the optical magnetic (magneto-optical) data recording medium 5 is the same as that of the apparatus shown in FIG. 1. The light beam, which has been reflected by the optical magnetic (magneto-optical) data recording medium 5 and which has passed through the objective lens 4 and then the beam splitter 3, is converged by a converging lens 6. The converged light beam is split into a reflected light beam and a transmitted light beam by a beam splitter 7. The reflected light beam is reflected again by another reflecting surface of the beam splitter 7 and thereby deflected so that it can be directed in the same direction as that of the transmitted light beam. The sensor 8 is located at a position which is equally distant from the focal plane of the converging lens 6 associated with the two optical paths (i.e., at a midpoint of the focal planes of the two optical paths) in opposite directions along the optical axis. The sensor 8 has two sensor portions at positions where the two light beams enter the sensor 8. A first sensor portion of the sensor 8 has four light-receiving areas a, b, c and d, while a second sensor portion thereof has four light-receiving areas e, f, g and h.

In the apparatus shown in FIG. 3, detection of data signals is performed by obtaining an optical magnetic (magneto-optical) signal from (a+b+c+d)−(e+f+g+h) and by obtaining an embossed signal from (a+b+c+d)+(e+f+g+h), while detection of servo signals is performed by obtaining a focal point error signal from, for example, (b+d)−(f+h) and by obtaining a tracking position error signal from, for example, (b−d)−(f−h).

Conventionally, the frequencies of the focal point error signal and tracking position error signal, which are required as servo signals, range from dc to several hundreds of KHz, while the frequencies of the data signals extend from several hundreds of KHz to several tens of MHz. In recent years, an increase in the seeking speed has taken place, and the frequencies required for servo signals have accordingly expanded from dc to several MHz. Further, various types of modulation systems have been proposed in order to increase the recording density of data, and the frequencies required for data signals have also expanded from several KHz to several tens of MHz. That is, the frequency bandwidth of servo signals overlaps that of data signals.

However, in any of the above-described conventional apparatus shown in FIGS. 1, 2 and 3, data signals and servo signals are obtained using the outputs of the light-receiving areas of the same sensor, which are common to both types of signals. It is therefore impossible in the conventional apparatus to perform frequency division in such a manner that servo signals and data signals can exist at the same time. Further, production cost of the apparatus is increased if a wide band dc amplifier for boosting the frequencies from dc to several tens of MHz is connected to the output side of each of the light-receiving areas.

SUMMARY OF THE INVENTION

In view of the aforementioned problems of the prior art, an object of the present invention is to provide an optical (magneto-optical) data recording/reproducing apparatus, which is capable of obtaining data signals and servo signals separately and which requires no expensive amplifiers for detecting data signals and servo signals and thus enables a reduction in production cost.

In order to achieve the above-described object, according to one aspect of the present invention, there is provided an optical data recording/reproducing apparatus which comprises light-receiving means for receiving a light beam that is one of reflected by and passed through a recording medium, the light-receiving means having a plurality of light-receiving areas for wavefront splitting the light beam and for receiving the split light beams. The apparatus also includes data signal generating means for generating a data signal on the basis of an output of at least one of the plurality of light-receiving areas, and servo signal generating means for generating a servo signal on the basis of an output of at least one of the plurality of light-receiving areas. A light-receiving area used to obtain the data signal and a light-receiving area used to obtain the servo signal are different from each other.

According to another aspect of the present invention, there is provided an optical data recording/reproducing apparatus which comprises illumination means for illuminating a recording medium with a light beam, converging means for converging a light beam that is one of reflected by and passed through the recording medium into a converged light beam, splitting means for splitting the converged light beam into two light beam portions, first light receiving means and second light-receiving means for respectively receiving the two light beam portions, each of the light-receiving means having a plurality of light-receiving areas, data signal detection means for detecting a data signal on the basis of an output of a portion of the light-receiving areas of the first light-receiving means and an output of a portion of the light-receiving areas of the second light-receiving means, and servo signal detection means for detecting a servo signal on the basis of an output of a portion of the light-receiving areas of the first light-receiving means and an output of a portion of the light-receiving areas of the second light-receiving means. The light-receiving areas used to produce the data signal are different from the light-receiving areas used to produce the servo signals.

According to still another aspect of the present invention, there is provided an optical data recording/reproducing apparatus which comprises illumination means for illuminating a recording medium with a light beam, converging means for converging a light beam that is one of reflected by and passed through the recording medium into a converged beam, splitting means for splitting the converged light beam into two light beam portions, direction means for directing the split two light beam portions onto a single light-receiving surface, which is capable of receiving the two light beam portions through optical paths having different optical path lengths, the direction means directing one of the split light beam portions onto the light-receiving surface before the light beam portion passes through a convergence point thereof and directing the other light beam portion onto the light-receiving surface after the light beam portion has passed through a convergence point thereof, a first light-receiving area, provided on the light-receiving surface, for receiving a portion of each of the two light beam portions to produce data signals, and a second light-receiving area provided on the light-receiving surface for receiving a portion of each of the two light beam portions to produce servo signals. The light-receiving area used to produce the data signals and the light-receiving area used to produce the servo signals are provided at different locations on the light-receiving surface.

DETAILED DESCRIPTION OF THE PREFERRED EMBODIMENTS

Embodiments of the present invention will be described below with reference to the accompanying drawings.

Figure 4:
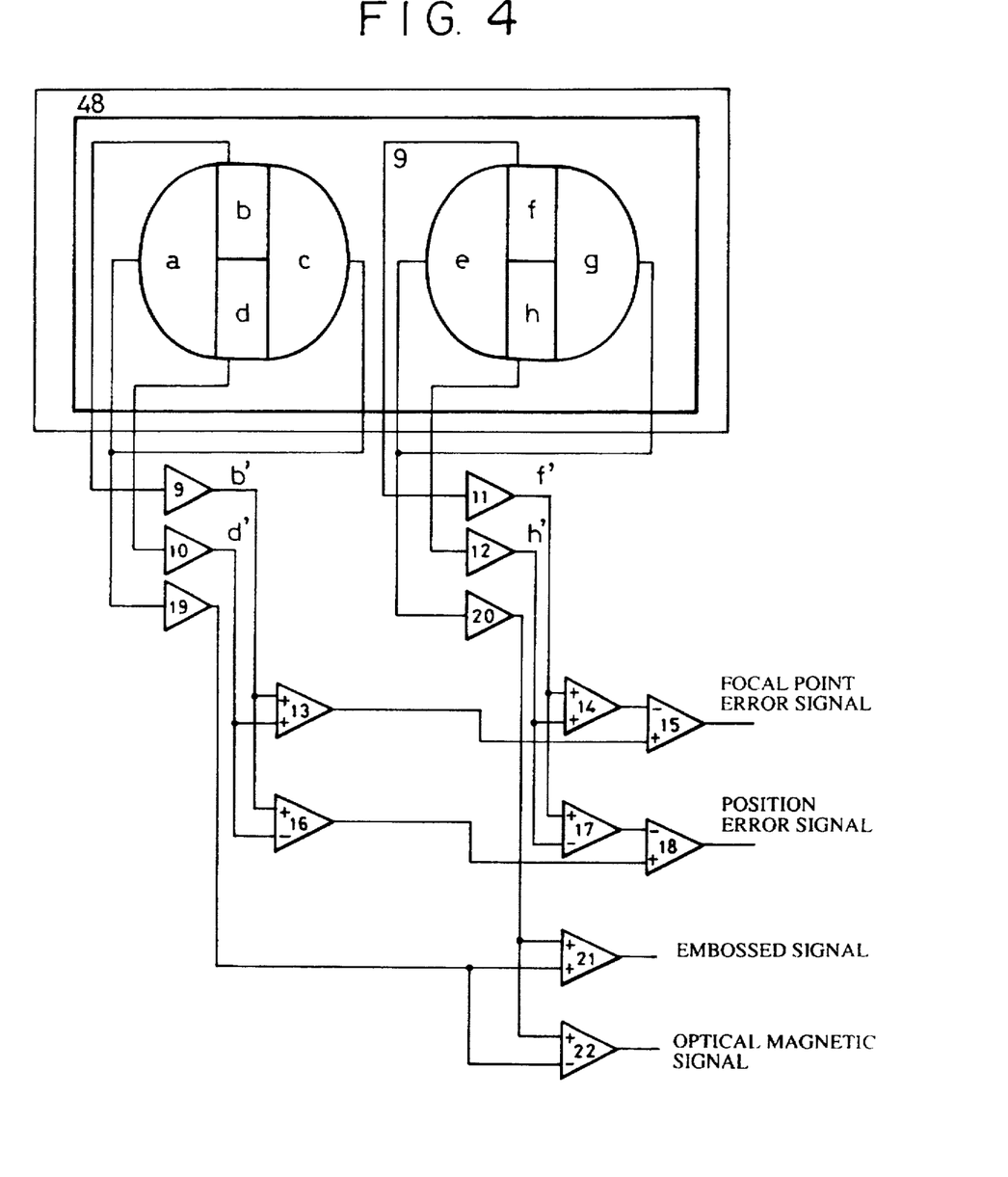
FIG. 4 illustrates a light-receiving surface of a sensor and a peripheral circuit thereof in a first embodiment of an optical data recording/reproducing apparatus according to the present invention.

FIG. 4 illustrates the light-receiving surface of a sensor and a peripheral circuit thereof in a first embodiment of the optical data recording/reproducing apparatus according to the present invention. In FIG. 4, reference numeral 48 denotes a sensor in which light-receiving areas a through h are formed on the same chip. Reference numerals 9 through 12 respectively denote current/voltage converting amplifiers. Reference numerals 13 through 18 respectively denote operational amplifiers. Reference numerals 19 and 20 respectively denote current/voltage converting amplifiers. Reference numerals 21 and 22 respectively denote operational amplifiers.

The optical system used in this embodiment is the same as that of the apparatus shown in FIG. 3. Therefore, reference is made to the discussion above. That is, a collimator lens 2 converts a bundle of light rays emanating from the semiconductor laser 1 into a beam made up of parallel rays of light. After the beam made up of parallel rays is reflected by the beam splitter 3, it is converged onto the recording surface of the optical magnetic (magneto-optical) data recording medium 5 by the objective lens 4 to form a light spot. The light beam, which has been reflected by the optical magnetic (magneto-optical) data recording medium 5 and which has passed through the objective lens 4 and then the beam splitter 3, is converged by the converging lens 6. The converged light beam is split into a reflected light beam and a transmitted light beam by the beam splitter 7. The reflected light beam is reflected again by another reflecting surface of the beam splitter 7 and thereby deflected so that it can be directed in the same direction as that of the transmitted light beam.

In the present embodiment, the sensor 48 is located at a position which is equally distant from the focal plane of the converging lens 6 associated with the two optical paths in opposite directions along the optical axis (i.e., at a midpoint of the focal planes of the two optical paths). The sensor 48 has two sensor portions at positions where the two light beams enter the sensor 48.

As shown in FIG. 4, the first sensor portion of the sensor 48 has four light-receiving areas a, b, c and d, while the second sensor portion thereof has four light-receiving areas e, f, g and h. The first sensor portion performs wavefront splitting on the reflected light beam produced by the beam splitter 7 and receives the split light beams. The second sensor portion performs wavefront splitting on the transmitted light beam produced by the beam splitter 7, and receives the split light beams. The light beams incident on the light-receiving areas b, d, f and h are converted into currents, and the produced currents are respectively input to the current/voltage converting amplifiers 9, 10, 11 and 12. Since the light-receiving areas b, d, f and h are used only to obtain servo signals, dc amplifiers for amplifying the servo bandwidth (the frequency bandwidth required for the servo control) may be used as the current/voltage converting amplifiers 9, 10, 11 and 12. The signals b', d', f' and h' respectively obtained by the current/voltage converting amplifiers 9, 10, 11 and 12 are operated on by the amplifiers 13 through 18 to obtain a focal point error signal (b'+d')−(f'+h') and a tracking position error signal (which is merely indicated as a position error signal in FIG. 4) (b'−d')−(f'−h'). The light beams incident on the light-receiving areas a, c, e and g of the sensor 48 are converted into currents, and the currents produced from the light-receiving areas a and c and the currents produced from the light-receiving areas e and g are respectively input to the current/voltage converting amplifiers 19 and 20. Since the light-receiving areas a, c, e and g are used only to obtain data signals, wide band ac amplifiers may be used as the current/voltage converting amplifiers 19 and 20. The amplifier 21 performs addition on the output signals of the current/voltage converting amplifiers 19 and 20. The output of the amplifier 21 is an embossed signal. The amplifier 22 performs subtraction on the output signals of the current/voltage converting amplifiers 19 and 20, and produces an optical magnetic (magneto-optical) signal.

Thus, this embodiment can employ inexpensive dc amplifiers for amplifying a frequency band of several MHz, which are available on the market, for the detection of servo signals, and ac amplifiers for amplifying a frequency band of several tens of MHz for the detection of data signals.

Figure 5:
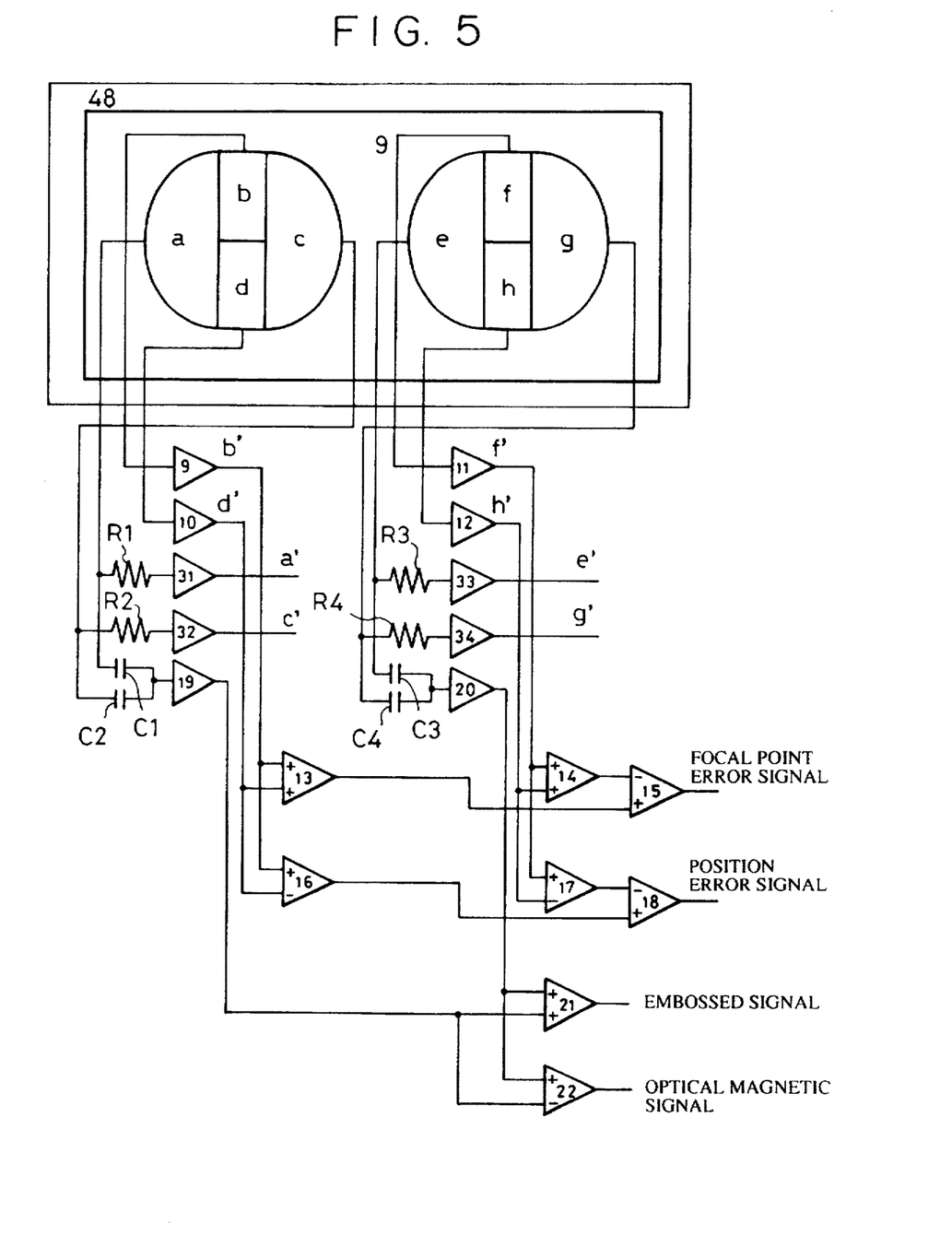
FIG. 5 illustrates a light-receiving surface of a sensor and a peripheral circuit thereof in a second embodiment of an optical data recording/reproducing apparatus according to the present invention.

FIG. 5 illustrates the light-receiving surface of a sensor 48 and a peripheral circuit thereof in a second embodiment of the optical data recording/reproducing apparatus according to the present invention. Identical reference numerals in FIG. 5 to those in FIG. 4 represent similar or identical elements. In FIG. 5, reference numerals 31 through 34 respectively denote current/voltage converting amplifiers used for adjustment. Since the optical system of this embodiment is the same as that of the apparatus shown in FIG. 3, description thereof is omitted.

As shown in FIG. 5, the sensor 48 has two sensor portions. The first sensor portion of the sensor 48 has four light-receiving areas a, b, c and d, while the second sensor portion thereof has four light-receiving areas e, f, g and h. The first sensor portion receives the reflected light beam by the beam splitter 7. The second sensor portion receives the transmitted light beam by the beam splitter 7. The light beams incident on the light-receiving areas b, d, f and h are converted into currents, and the produced currents are respectively input to the current/voltage converting amplifiers 9, 10, 11 and 12. Since the light-receiving areas b, d, f and h are used only to obtain servo signals, dc amplifiers for amplifying the servo bandwidth (the frequency bandwidth required for the servo control) may be used as the current/voltage converting amplifiers 9, 10, 11 and 12. The signals b', d', f' and h' respectively obtained by the current/voltage converting amplifiers 9, 10, 11 and 12 are respectively operated on by the amplifiers 13 through 18 to obtain a focal point error signal (b'+d')−(f'+h') and a tracking position error signal (b'−d')−(f'−h'). The light beams incident on the light-receiving areas a, c, e and g of the sensor 48 are converted into currents, and the currents produced from the light-receiving areas a and c and the currents produced from the light-receiving areas e and g are respectively input to the current/voltage converting amplifiers 19 and 20 for amplifying frequencies from several KHz to several tens of MHz through capacitors C1 through C4 and to the current/voltage converting amplifiers 31 to 34 through resistors R1 to R4. Since the light-receiving areas a, c, e and g are used only to obtain data signals, wide band ac amplifiers may be used as the current/voltage converting amplifiers 19 and 20. The amplifier 21 performs addition on the output signals of the current/voltage converting amplifiers 19 and 20. The output of the amplifier 21 is an embossed signal. The amplifier 22 performs subtraction on the output signals of the current/voltage converting amplifiers 19 and 20, and produces an optical magnetic (magneto-optical) signal. Inexpensive dc amplifiers can be used as the current/voltage converting amplifiers 31 through 34 because the current/voltage converting amplifiers 31 through 34 are used for adjusting the sensor position.

Thus, this embodiment has an advantage in that the signals for adjusting the position of the sensor can be obtained by using no more than 8 divisions a through h, in addition to the advantage offered by the embodiment shown in FIG. 4.

Figure 6:
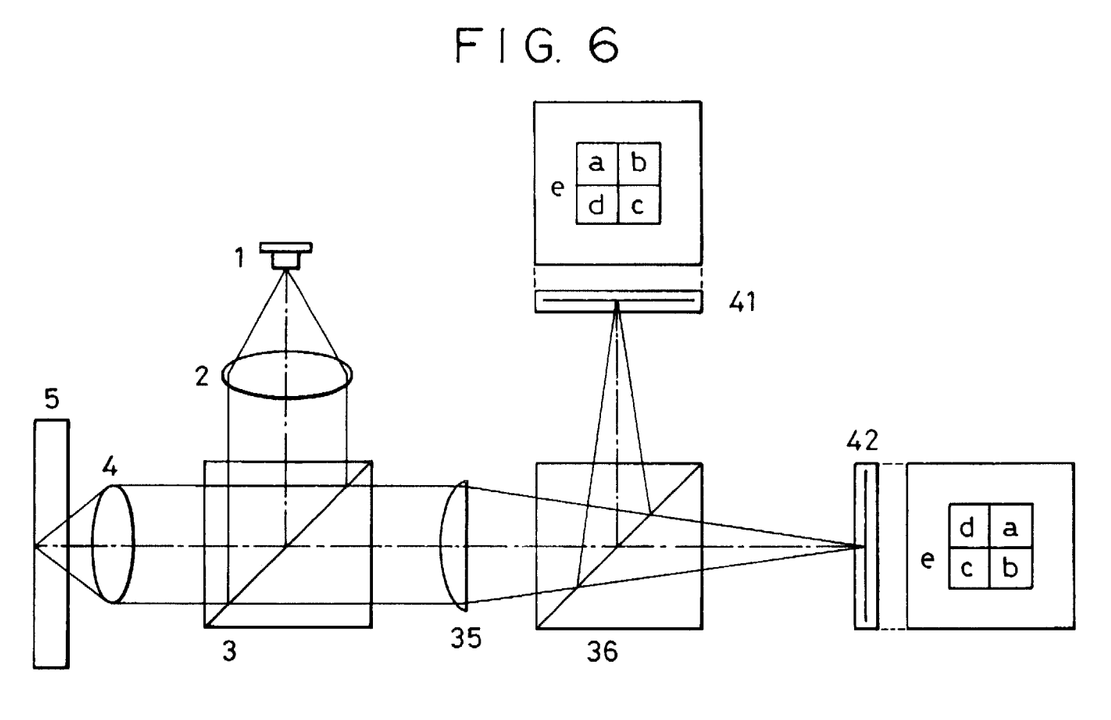
FIG. 6 illustrates detection mechanisms for detecting servo signals and data signals in a third embodiment of an optical data recording/reproducing apparatus according to the present invention.

FIG. 6 illustrates the detection mechanisms for servo signals and data signals in a third embodiment of the optical data recording/reproducing apparatus according to the present invention. The optical system of this embodiment is the same as that of the apparatus shown in FIG. 1 except for a structure including sensors 41 and 42. The sensors 41 and 42 have light-receiving areas a, b, c, d and e, respectively.

In this embodiment, detection of data signals is performed by obtaining an optical magnetic (magneto-optical) signal from a difference between the output of the light-receiving area e of the sensor 41 and the output of the light-receiving area e of the sensor 42 and by obtaining an embossed signal from a sum of the output of the light-receiving area e of the sensor 41 and the output of the light-receiving area e of the sensor 42. Detection of servo signals is performed by obtaining a focal point error signal from, for example, (a+c)−(b+d) of the sensor 41 and by obtaining a tracking position error signal from, for example, (b+c)−(a+d) of the sensor 42.

Figure 7:
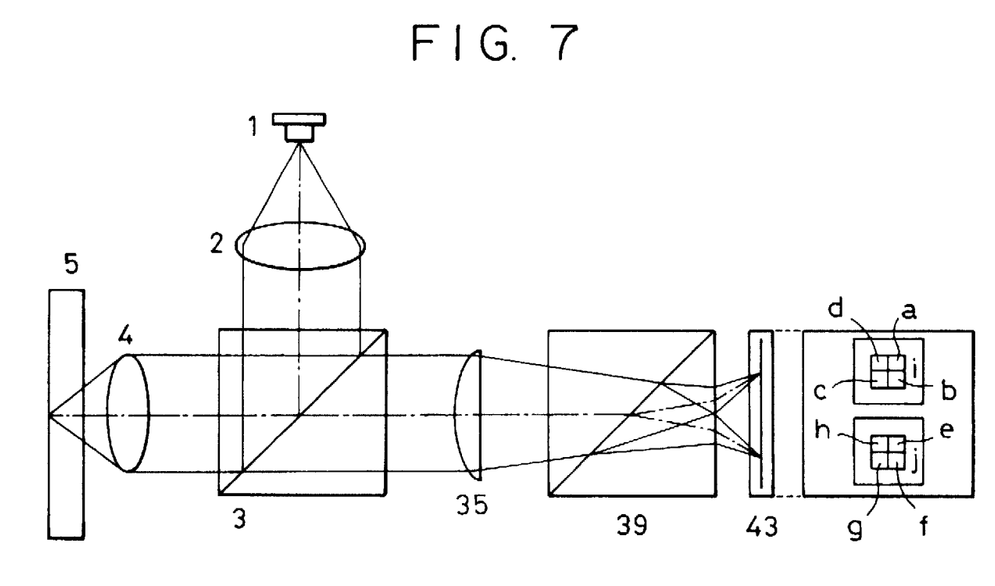
FIG. 7 illustrates detection mechanisms for detecting servo signals and data signals in a fourth embodiment of an optical data recording/reproducing apparatus according to the present invention.

FIG. 7 illustrates the detection mechanisms for servo signals and data signals in a fourth embodiment of the optical data recording/reproducing apparatus according to the present invention. The optical system of this embodiment is the same as that of the apparatus shown in FIG. 2 except for a structure including a sensor 43. A first sensor portion of the sensor 43 has light-receiving areas a, b, c, d and i, and a second sensor portion of the sensor 43 has light-receiving areas e, f, g, h and j.

In this embodiment, detection of data signals is performed by obtaining an optical magnetic (magneto-optical) signal from a difference between the output of the light-receiving area i and the output of the light-receiving area j of the sensor 43 and by obtaining an embossed signal from a sum of the output of the light-receiving area i and the output of the light-receiving area j of the sensor 43. Detection of servo signals is performed by obtaining a focal point error signal from, for example, (a+c)−(b+d) and by obtaining a tracking position error signal from, for example, (f+g)−(e+h).

Accordingly, FIG. 7 shows an optical data recording/reproducing apparatus that includes a semiconductor laser 1, a collimator lens 2, a beam splitter 3 and an objective lens 4 for illuminating recording medium 5 with a light beam. A light beam that is one of reflected by and passed through the recording medium 5 is converged into a converged light beam by a cylindrical lens 35. The light beam from the cylindrical lens 35 is split into two light beams by a Wollaston prism 39. The two split light beams are made incident on a sensor 43 having two sensor portions on the same surface.

FIG. 7 shows an arrangement in which light receiving areas i and j are provided on the light receiving surface of sensor 43 for receiving a portion of each of the two light beam portions to produce data signals and second light receiving areas (a through d) and (f through h), provided on the light receiving surface, for receiving a portion of each of the two light beam portions to produce servo signals. The sensor 43 is capable of receiving the two split light beam portions through optical paths having different optical lengths. The Wollaston prism 39 directs one of the split light beam portions onto the light-receiving surface before the light beam portion passes through a convergence point thereof and directs the other light beam portion onto the light-receiving surface after the light beam portion has passed through a convergence point thereof.

The light receiving areas used to produce the data signals and the light receiving areas used to produce the servo signals are provided at different locations on the light-receiving surface. Further, the light-receiving areas used to produce the servo signals are within the light-receiving areas used to produce the data signals. In fact, the light-receiving areas (i and j) used to produce the data signal surround the light-receiving areas used to produce the servo signals (a through d) and (f through h), respectively.

In the above-described embodiments of the present invention, since the light-receiving areas used to obtain data signals and the light-receiving areas used to obtain servo signals are provided separately, amplifiers suitable to the respective frequency bandwidths can be used as the amplifiers for servo signals and those for data signals. Accordingly, the use of expensive amplifiers is unnecessary, and consequently, an optical data recording/reproducing apparatus can be provided at a low cost.

The present invention can be applied to any type of data recording/reproducing apparatus, such as an optical magnetic (magneto-optical) data recording/reproducing apparatus or an optical data recording/reproducing apparatus, which has a servo function.

The present invention can also be applied to apparatus having a structure other than that in which the light beam reflected by the recording medium is split into two portions by, for example, a beam splitter, e.g., a structure which is the same as that shown in FIG. 6, but which contains neither the beam splitter 36 nor the sensor 41. In this case, detection of data signals is performed by utilizing the output of the light-receiving area e, and detection of servo signals is performed by utilizing the outputs of the light-receiving areas a through d.

Except as otherwise disclosed herein, the various components shown in outline or in block form in the Figures are individually well known and their internal construction and operation are not critical either to the making or using of this invention or to a description of the best mode of the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical data recording/reproducing apparatus comprising:

light-receiving means for receiving a light beam that is one of reflected by and passed through a recording medium, said light-receiving means having a plurality of light-receiving areas for both (i) wavefront splitting the light beam into split light beams and (ii) receiving the split light beams, each of said plurality of light-receiving areas being provided directly adjacent to at least one other of said plurality of light-receiving areas on one continuous surface of said light-receiving means;

data signal generating means for generating a data signal on the basis of outputs of said plurality of light-receiving areas; and servo signal generating means for generating a servo signal on the basis of outputs of said plurality of light-receiving areas, wherein said light-receiving areas used to obtain the servo signal are within said light-receiving areas used to obtain the data signal on the surface of said light-receiving means.

2. The optical data recording/reproducing apparatus according to claim 1, wherein the data signal comprises an optical magnetic signal and an embossed signal.

3. The optical data recording/reproducing apparatus according to claim 1, wherein the servo signal comprises a focal point error signal and a tracking position error signal.

4. The optical data recording/reproducing apparatus according to claim 1, further comprising a plurality of amplifiers for respectively receiving the outputs of said plurality of light-receiving areas.

5. The optical data recording/reproducing apparatus according to claim 1, further comprising splitting means for splitting the light beam from the recording medium into a plurality of light beams.

6. The optical data recording/reproducing apparatus according to claim 1, further comprising light spot forming means for splitting the light beam from the recording medium into a plurality of light beams and for forming a plurality of light spots in said plurality of light-receiving areas.

7. The optical data recording/reproducing apparatus according to claim 4, further comprising data signal detection means for obtaining a data signal by operating on the outputs of said amplifiers.

8. The optical data recording/reproducing apparatus according to claim 4, further comprising servo signal detection means for obtaining a servo signal by operating on the outputs of said amplifiers.

9. An optical data recording/reproducing apparatus comprising:

illumination means for illuminating a recording medium with a light beam;

converging means for converging a light beam that is one of reflected by and passed through the recording medium into a converged light beam;

splitting means for splitting the converged light beam into two light beam portions;

first light-receiving means and second light-receiving means for respectively receiving the two light beam portions, each of said light-receiving means having a plurality of light-receiving areas;

data signal detection means for detecting a data signal on the basis of an output of a portion of said light-receiving areas of said first light-receiving means and an output of a portion of said light-receiving areas of said second light-receiving means; and servo signal detection means for detecting a servo signal on the basis of an output of a portion of said light-receiving areas of said first light-receiving means and an output of a portion of said light-receiving areas of said second light-receiving means, wherein said light-receiving areas used to produce the data signals are different from said light-receiving areas used to produce the servo signals and said light-receiving areas used to produce the data signals surround said light-receiving areas used to produce the servo signals, on each of said light receiving means.

10. The optical data recording/reproducing apparatus according to claim 9, wherein said splitting means comprises a Wollaston prism.

11. An optical data recording/reproducing apparatus comprising:

illumination means for illuminating a recording medium with a light beam;

converging means for converging a light beam that is one of reflected by and passed through the recording medium into a converged light beam;

splitting and directing means for splitting the converged light beam into two light beam portions and for directing the split two light beam portions onto a single light-receiving surface, which is capable of receiving the two light beam portions through optical paths having different optical path lengths, said splitting and directing means directing one of the split light beam portions onto said light-receiving surface before the light beam portion passes through a convergence point thereof and directing the other light beam portion onto said light-receiving surface after the light beam portion has passed through a convergence point thereof;

first light-receiving areas, provided on said light-receiving surface for receiving a portion of each of the two light beam portions to produce data signals; and second light-receiving areas, provided on said light-receiving surface, for receiving a portion of each of the two light beam portions to produce servo signals, wherein said light-receiving areas used to produce the data signals and said light-receiving areas used to produce the servo signals are provided at different locations on said light-receiving surface, the light-receiving areas used to produce the servo signals being within the light-receiving areas used to produce the data signals.

12. The optical data recording/reproducing apparatus according to claim 11, wherein said light-receiving areas used to produce the data signals surround said light-receiving areas used to produce the servo signals.

13. An optical data reproducing apparatus comprising:

illumination means for illuminating a recording medium with a light beam;

splitting means for splitting the light beam from the recording medium into a plurality of light beams; and light-receiving means for receiving a light beam from among the plurality of light beams split by said splitting means, said light-receiving means independently having first light-receiving areas used to obtain a data signal and second light-receiving areas used to obtain a servo signal, wherein said light-receiving areas used to obtain the data signal and said light-receiving areas used to obtain the servo signal are independently provided directly adjacent to each other on one continuous surface of said light-receiving means, the servo signal light-receiving areas being within the data signal light-receiving areas on the surface of said light-receiving means.

14. An optical data reproducing apparatus according to claim 13, wherein the servo signal comprises a focal point error signal and a tracking position error signal.

15. An optical data reproducing apparatus according to claim 13, wherein outputs of said first light-receiving area and said second light-receiving area are produced through respective amplifiers.

16. An optical data reproducing apparatus comprising:

illumination means for illuminating a recording medium with a light beam; and light-receiving means for receiving a light beam from the recording medium, said light-receiving means independently comprising first light-receiving areas used to obtain a data signal and second light-receiving areas used to obtain a servo signal, wherein said light-receiving areas used to obtain the data signal and said light-receiving areas used to obtain the servo signal are independently provided directly adjacent to each other on one continuous surface of said light-receiving means, the servo signal light-receiving areas being within the data signal light-receiving areas on the surface of said light-receiving means.

17. An optical data reproducing apparatus according to claim 16, wherein the servo signal comprises a focal point error signal and a tracking position error signal.

18. An optical data reproducing apparatus according to claim 16, wherein outputs of said first light-receiving area and said second light-receiving area are produced through respective amplifiers.

* * * * *